United States Patent
Koga

(10) Patent No.: US 7,648,014 B2
(45) Date of Patent: Jan. 19, 2010

(54) ONE-WAY CLUTCH AND ELECTRIC PARKING BRAKE DEVICE USING THE SAME

(75) Inventor: Keiichi Koga, Chiryu (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 531 days.

(21) Appl. No.: 11/501,764

(22) Filed: Aug. 10, 2006

(65) Prior Publication Data

US 2007/0068765 A1    Mar. 29, 2007

(30) Foreign Application Priority Data

Sep. 27, 2005    (JP)    ............... 2005-280375

(51) Int. Cl.
  *B60T 7/00*    (2006.01)
  *F16D 41/20*    (2006.01)
(52) U.S. Cl. ............... 192/223.4; 188/2 D; 188/162
(58) Field of Classification Search ............. 192/223.4; 188/77 W, 82.6
  See application file for complete search history.

(56) References Cited

U.S. PATENT DOCUMENTS 4,533,027 A * 8/1985 Otani et al. ............... 192/223.4
4,614,257 A * 9/1986 Harada et al. ............ 192/223.4
4,953,676 A * 9/1990 Yamada et al. ........... 192/223.4
5,261,732 A * 11/1993 Matouka ................... 303/115.2

FOREIGN PATENT DOCUMENTS

JP    2004-161192 A    6/2004
JP    2005-016600 A *  1/2005

* cited by examiner

*Primary Examiner*—Richard M. Lorence
(74) *Attorney, Agent, or Firm*—Buchanan Ingersoll & Rooney PC

(57) ABSTRACT

In a one-way clutch as used preferably in an electric parking brake device, a sector-shape input cam provided bodily with an input rotational member is inserted into a sector-shape cutout of an output cam provided bodily with an output rotational member, with clearances secured in the circumferential direction between circumferentially end surfaces of the input and output cams. A coil spring is placed in an annular space between an internal surface of a stationary cylinder member and external surfaces of the input and output cams and is provided at both ends thereof with curved portions which are placed respectively in the clearances. A cam surface is formed on a part of each circumferentially inner end surface of the cutout. The cam surface is contactable with a part of the curved portion facing therewith for generating, in addition to a force expanding the outer diameter of the coil spring, another force which pressures the neighborhood of the curved portion of the coil spring on the internal surface of the cylinder member thereby to additionally prevent the rotation transmission from the output rotational member toward the input rotational member.

8 Claims, 5 Drawing Sheets

ONE-WAY CLUTCH AND ELECTRIC PARKING BRAKE DEVICE USING THE SAME

INCORPORATION BY REFERENCE

This application is based on and claims priority under 35 U.S.C. 119 with respect to Japanese Application No. 2005-280375 filed on Sep. 27, 2005, the entire content of which is incorporated herein by reference.

BACKGROUND OF THE INVENTION

1. Field of the Invention

The present invention relates to a one-way clutch capable of transmitting the rotation of an input rotational member to an output rotational member, but preventing the rotation of the output rotational member from being transmitted to the input rotational member. Further, it relates to an electric parking brake device using the one-way clutch.

2. Discussion of the Related Art

As electric parking brake devices, there has been known one which is described in Japanese unexamined, published patent application No. 2004-161192. The device is composed of an electric motor having an output shaft rotatable in either of positive and negative-going directions, a rotation transmission mechanism for bringing a parking brake into the braking state when rotationally driven by the electric motor in the positive-going direction but into the braking release state when rotationally driven in the negative-going direction, and a one-way clutch (brake mechanism) provided at a part of the rotation drive train of the rotation transmission mechanism for transmitting the rotation of an input rotational member on the electric motor side to an output rotational member on the parking brake side, but preventing the rotation of the output rotational member from being transmitted to the input rotational member. The one-way clutch is composed of an outer ring having a cylindrical internal surface and locked on a housing, an output shaft rotatably provided in the outer ring and having a sector-shape opening portion formed at one end thereof, an input shaft rotatably provided in the outer ring and having a sector-shape expansion portion which radially protrudes and is housed in the sector-shape opening portion of the output shaft, and a coil spring being in friction contact with the internal surface of the outer ring under a predetermined friction engaging force and having respective radially inwardly curved ends interposed respectively between clearances which are defined between the sector-shape opening portion and the sector-shape expansion portion in the circumferential direction.

In the one-way clutch disclosed in the aforementioned patent application, when the input shaft is given rotation from the electric motor, the sector-shape expansion portion is brought into contact with one end of the coil spring to exert the rotational power on the coil spring, and the rotational power acts to contract the outer diameter of the coil spring regardless of whether the rotational direction is the positive or negative-going direction. Thus, the coil spring slides on the internal surface of the outer ring to rotate together with the input shaft, whereby the output shaft is also rotated as a result of the sector-shape opening portion being pushed at one inner end surface thereof. Conversely, when rotation is given from the parking brake side to the output shaft, one inner end surface of the sector-shape opening portion is brought into contact with one end portion of the coil spring to exert the rotational power on the coil spring, in which case the rotational power acts to expand the outer diameter of the coil spring regardless of whether the direction of the rotational power is the positive or negative-going direction. Thus, because the coil spring is pressured strongly on the internal surface of the outer ring, the sliding of the coil spring on the internal surface of the outer ring is prevented thereby to cause the input shaft not to rotate. That is, rotation is transmitted from the input shaft side toward the output shaft side, but is prevented from the output shaft side toward the input shaft side.

In the aforementioned patent application, as a modified embodiment of the one-way clutch, there is also described one in which a coil spring is engaged at its internal surface portion with the external surface of a shaft locked to the housing, under a predetermined friction engaging force.

As described above, in the one-way clutch described in the aforementioned patent application, it is possible to prevent rotation transmission from the output shaft side toward the input shaft side. However, it may be the case that rotation is given from the output shaft side in dependence on the operation condition that lubrication oil is flown to between the coil spring and the outer ring or that vibration or impact is added to the one-way clutch. In that case, it is likely that the coil spring slides relative to the outer ring and hence, that the operation to prevent rotation transmission toward the input shaft side become unreliable to degrade the function of the one-way clutch.

SUMMARY OF THE INVENTION

Accordingly, it is a primary object of the present invention to provide an improved one-way clutch capable of solving the foregoing problems and to provide an improved electric parking brake device using the one-way clutch so improved.

Briefly, according to the present invention, there is provided a one-way clutch for transmitting rotation from an input rotational member side toward an output rotational member side but for preventing rotation from being transmitted from the output rotational member side toward the input rotational member side. The one-way clutch comprises a stationary member having a circumferential surface; the input rotational member and the output rotational member each provided rotatably in axial alignment with the stationary member; an output cam provided bodily with the output rotational member and having a cutout of sector shape coaxial with the axis of the stationary member; an input cam provided bodily with the input rotational member and inserted into the cutout with clearances secured in the circumferential direction between circumferentially outer end surfaces thereof and circumferentially inner end surfaces of the cutout; and a coil spring placed in an annular space between the circumferential surface of the stationary member and respective circumferential surfaces of the input and output cams and frictionally engageable with the circumferential surface of the stationary member when pressured resiliently on the circumferential surface. The coil spring is provided at least one end thereof with a curved portion which is placed in one of the clearances. A cam surface is formed at one of a part of the cutout and a part of the curved portion which parts are brought into contact with each other when the rotation of the output rotational member is about to be transmitted toward the input rotational member. Upon contact with the other of the part of the cutout and the part of the curved portion, the cam surface is operable for generating a force which pressures the neighborhood of the curved portion of the coil spring on the circumferential surface of the stationary member. A protruding portion protrudes from one of a circumferentially outer end surface of the input cam and a circumferentially inner end surface facing therewith of the cutout toward the other of the circumferentially outer and inner end surfaces. When the rotation of the input rotational member is about to be transmitted toward the output rotational member, the protruding portion is brought into contact with the other of the circumferentially outer and inner end surfaces to separate the cam surface from the other of the parts of the cutout and the curved portion and to perform the rotation transmission.

With this construction, when the rotation of the output rotational member is about to be transmitted toward the input rotational member, the part of the cutout of the output cam pushes the part of the curved portion of the coil spring, and the pressuring force pressures the neighborhood of the curved portion on the circumferential surface of the stationary member in addition to changing the diameter of the coil spring to increase the pressuring force of the coil spring on the circumferential surface of the stationary member. Thus, the force which prevents the coil spring from sliding on the circumferential surface of the stationary member is additionally reinforced, so that rotation transmission from the output rotational member toward the input rotational member can be prevented reliably irrespective of the operation condition given to the one-way clutch.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

First Embodiment

Figure 1:
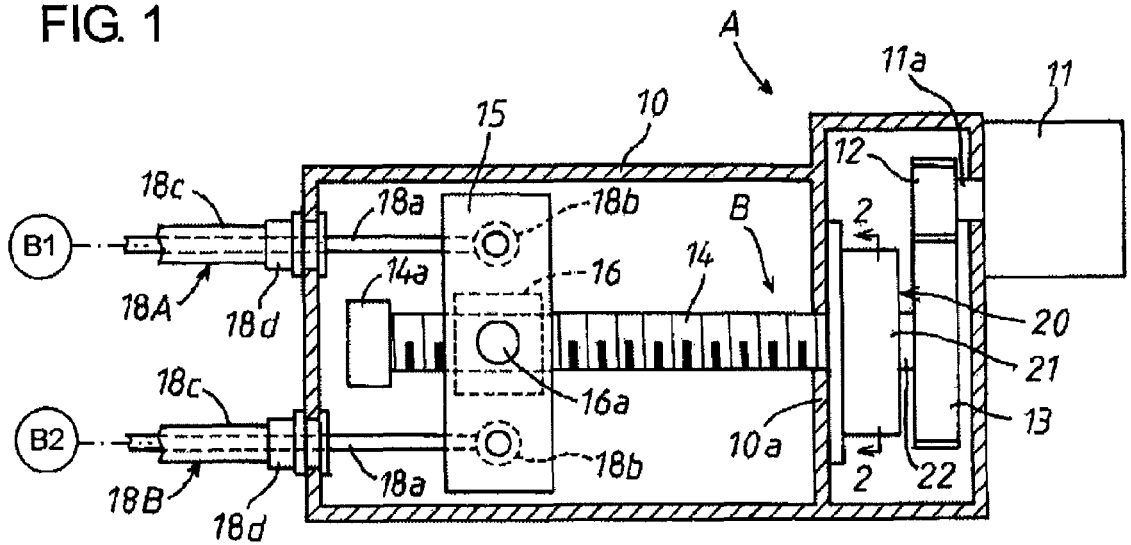
FIG. 1 is a plan view showing the overall schematic construction of an electric parking brake device using a one-way clutch in a first embodiment according to the present invention.

Hereafter, a one-way clutch and an electric parking brake device using the same in a first embodiment will be described with reference to FIGS. 1 to 5.

First of all, the overall construction of the electric parking brake device A according to the present invention will be described with reference to FIG. 1. A cylinder member (stationary member) 21 of the one-way clutch 20 described later in detail is secured to a partition wall 10a which is provided at an intermediate portion of a housing 10 of the electric parking brake device A. An input shaft (input rotational member) 22 and a screw shaft 14 in axial alignment are protruded from the opposite sides of the cylinder member 21 in opposite directions with each other, and a large reduction gear 13 is secured to the input shaft 22 which is extended into one chamber of the housing 10. An electric motor 11 is provided on the housing 10 to be rotatable in either of the positive and negative-going directions, and a small reduction gear 12 which is secured to a motor shaft 11a extended into one chamber is in meshing with the large reduction gear 13, so that the input shaft 22 is drivingly rotated at a reduced speed in any of the positive and negative-going directions. Thus, the both reduction gears 12, 13 and the one-way clutch 20 constitutes a rotation transmission mechanism B for transmitting the rotation of the electric motor 11 to the screw shaft 14.

A nut 16 is screw-engaged with the screw shaft 14 extending lengthily into the other chamber of the housing 10, and a coming-off stop 14a is provided at an end of the screw shaft 14. An elongated equalizer 15 is swingably carried at a center portion thereof on the nut 16 through a pivot pin 16a. An end wall of the housing 10 perpendicular to the screw shaft 14 supports respective one ends of outer tubes 18c for a pair of control cables 18A, 18B through mountings 18d at positions symmetrical with respect to the center axis of the screw shaft 14. Inner wires 18a extending to pass through the respective outer tubes 18c are pivotably connected through connection pins 18b to opposite end portions of the equalizer 15 which are equidistant from the pivot pin 16a for the equalizer 15. Other ends of the inner wires 18a and the outer tubes 18c of the respective control cables 18A, 18B are connected respectively to discrete parking brakes (schematically shown as B1, B2 in FIG. 1) for wheels of a vehicle. Thus, when the motor shaft 11a of the electric motor 11 is rotated in the positive-going direction to rotate the screw shaft 14 in the positive-going direction through the rotation transmission mechanism B, the equalizer 15 swingably carried on the nut 16 is drawn toward the one-way clutch 20 side, whereby the respective parking brakes are operated with mutually equal powers. When the motor shaft 11a of the electric motor 11 is rotated in the negative-going direction to rotate the screw shaft 14 in the negative-going direction, the equalizer 15 is returned toward the coming-off stop 14a side, whereby the respective parking brakes are released.

Next, the one-way clutch 20 is described with reference to FIGS. 2 and 3. The primary components of the one-way clutch 20 are the cylinder member 21, an input cam 23 provided on the input shaft (input rotational member) 22, an output cam 26 provided on an output rotational member 25, and a coil spring 28. The cylinder member 21 is secured by means of fitting bolts 19 to the partition wall 10a and has a cylindrical internal surface (circumferential surface) 21a formed therein. The output rotational member 25 formed bodily with the screw shaft 14 is received in a bearing bore 10b formed in the partition wall 10a, to be rotatable in co-axial alignment with the cylinder member 21. A flange portion 25a and the output cam 26 are continuously and co-axially formed at one end within the cylinder member 21 of the output rotational member 25. A cutout 27 of sector shape which takes its center on the rotational axis of the output rotational member 25 is formed at a part of the outer circumference of the output cam 26, and a cylindrical hole 25b is formed at the center part of the output cam 26.

Figure 4:
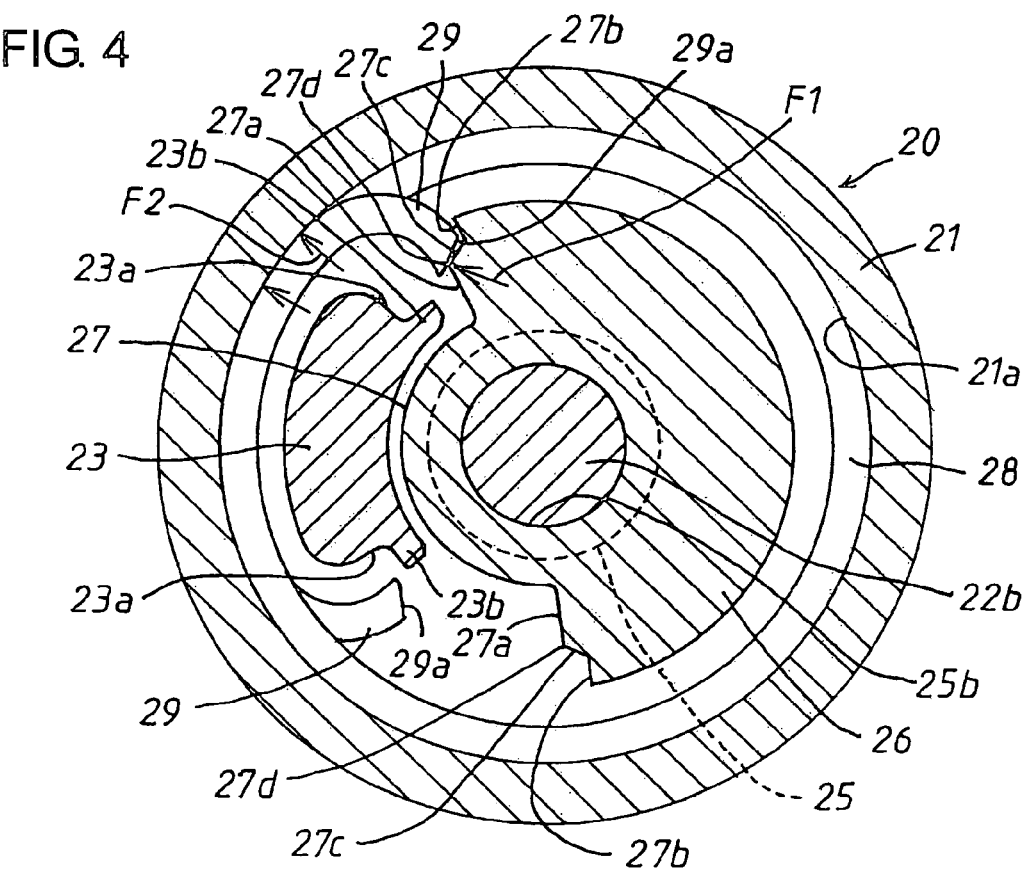
FIG. 4 is the same sectional view as shown in FIG. 2, showing an operation state that rotation transmission from an output rotational member side toward an input shaft side is being prevented.

Respective inner end surfaces 27a at opposite ends in the circumferential direction of the cutout 27 extend radially, as shown in FIG. 4. Each of the circumferentially inner end surfaces 27a has formed at its outside end portion an oblique surface (partly, a cam surface) 27c which extends radially outward at an obtuse angle and also has formed thereon a short outside end surface 27b which further extends radially from the outside end of the oblique surface 27c to reach the circumferential surface of the output cam 26. The oblique surface 27c and the outside end surface 27b define parts of the circumferentially inner end surface 27a.

Figure 3:
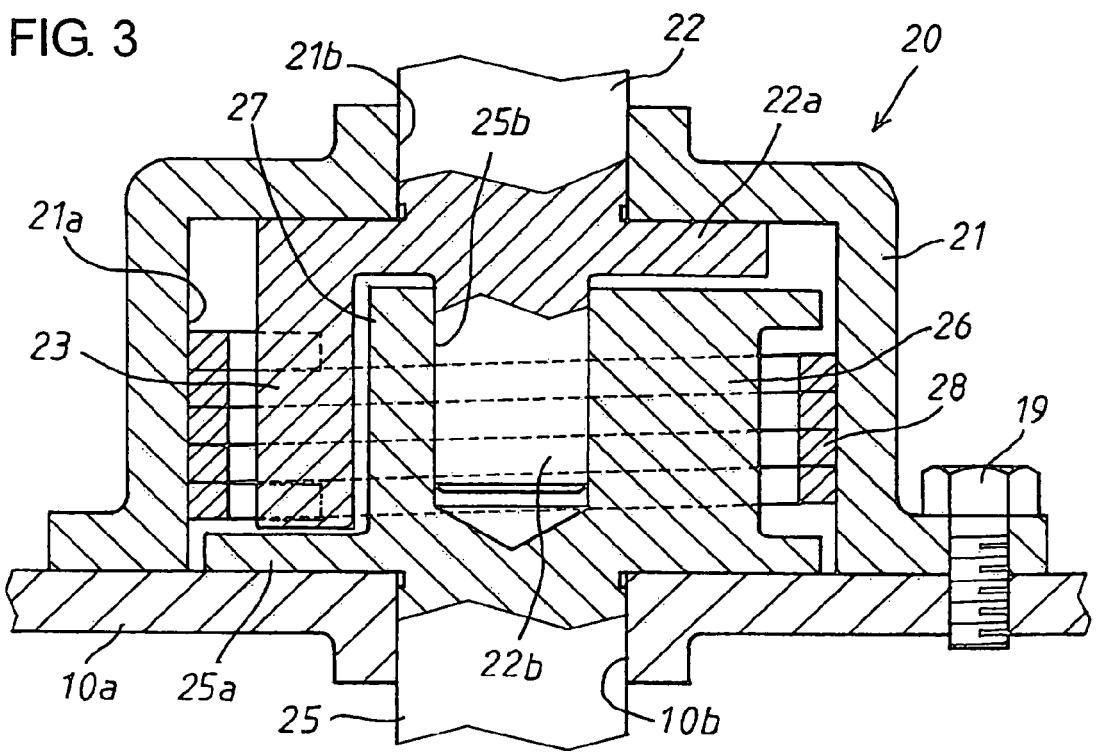
FIG. 3 is a fragmentary sectional view taken along the line 3-3 in FIG. 2.

The input shaft 22 is rotatably supported in a bearing bore 21b, formed at the center of an end wall of the cylinder member 21, to be rotatable in the coaxial alignment with the cylinder member 21 and is received in the cylindrical hole 25b at an extreme end portion 22b thereof, as best shown in FIG. 3. A flange portion 22a facing with the end surface of the output cam 26 is co-axially formed at one end in the cylinder member 21 of the input shaft 22. The flange portion 22a has bodily formed thereon a sector-shape input cam 23, which is inserted into the cutout 27 of the output rotational member 25 with clearances being secured circumferentially between circumferentially outer end surfaces 23a of the input cam 23 and the circumferentially inner end surfaces 27a of the output cam 26. A pair of arc shape protruding portions 23b are formed at radially inside end portions on the circumferentially outer end surfaces 23a of the input cam 23 to protrude toward the circumferentially inner end surfaces 27a of the cutout 27 of the output rotational member 25. Between the internal surface 21a of the cylinder member 21 and the external surfaces of the input cam 23 and the output cam 26, there is defined an annular space sufficient to contain a coil spring 28 described below.

Figure 5:
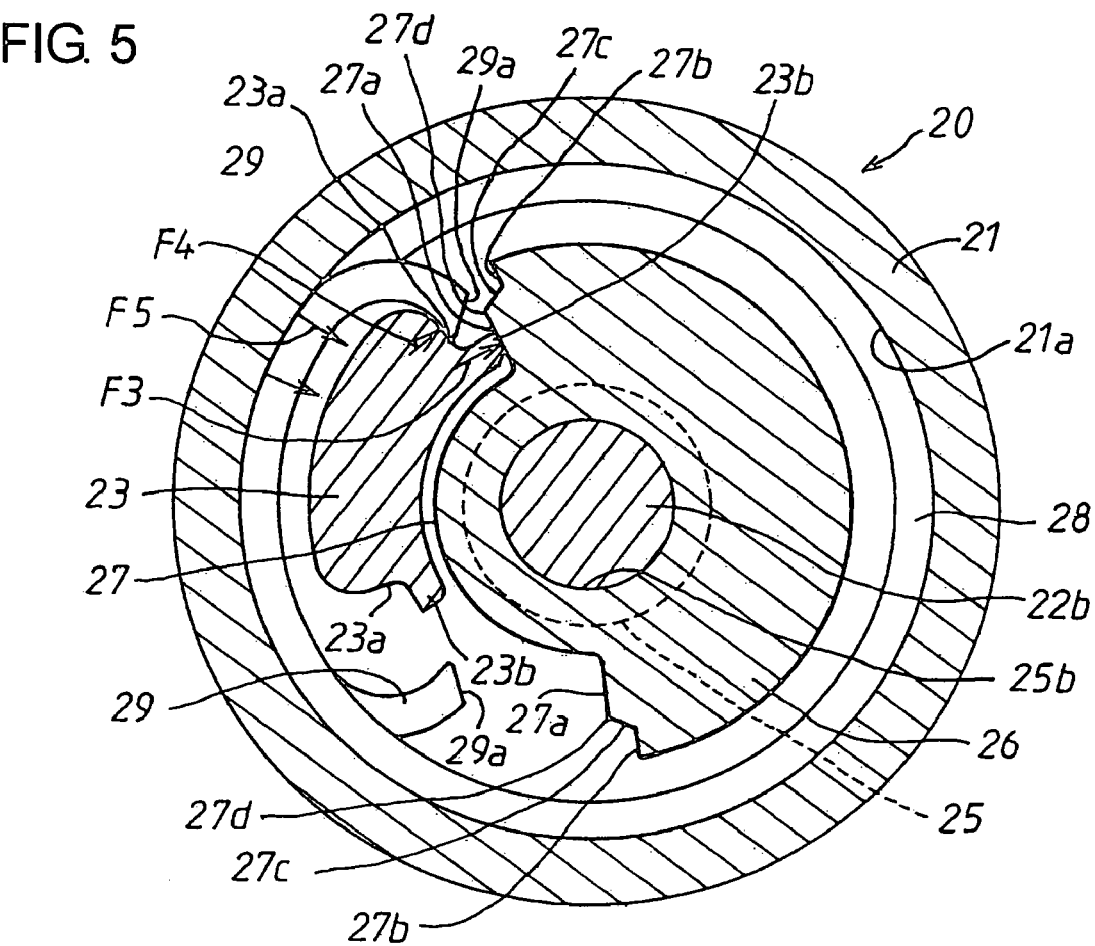
FIG. 5 is the same sectional view as shown in FIG. 2, showing another operation state that rotation transmission from the input shaft side to the output rotational member side is being performed.

Within the internal surface 21a of the cylinder member 21, the coil spring 28 being plural in the number of turns (four or more turns in the illustrated example) is received in friction engagement with the internal surface 21a by being pressured resiliently. The both end portions of the coil spring 28 are curved by about 90 degrees radially inward along an arc whose radius is relatively large, to define curved portions 29 whose extreme ends are placed respectively in the clearances between the circumferentially outer end surfaces 23a of the input cam 23 and the circumferentially inner end surface 27a of the cutout 27. The end surface 29a of each curved portion 29 of the coil spring 28 takes a cam surface which is inclined so that as shown in FIG. 2, the distance or radius R1 between one end thereof intersecting with the inside surface of the curved portion 29 and the rotational center of the output cam 26 is made to be shorter than the distance or radius R2 between the other end thereof intersecting with the outside surface of the curved portion 29 and the rotational center of the output cam 26. Thus, a dimensional relation is made for the cam surface 29a to come into contact with a corner or edge portion 27d at the juncture between the circumferentially inner end surface 27a and the oblique surface 27c on either circumferential side of the cutout 27, as shown in FIG. 4. Further, another dimensional relation is made to provide a clearance between the cam surface 29a at the end of the curved portion 29 and the edge portion 27d on the circumferentially inner end surface 27a in the state that as shown in FIG. 5, the protruding portion 23b is held in contact with the circumferentially inner end surface 27a of the cutout 27 and that the inside surface of the curved portion 29 is held in contact with the circumferentially outer end surface 23a of the input cam 23. The coil spring 28 used in the first embodiment is made of a wire rod taking quadrilateral shape in cross-section, though it may be made of a wire rod taking round shape in cross-section.

Operation of First Embodiment

Hereafter, description will be made regarding the operation of the device as constructed above in the first embodiment. When the counterclockwise rotation of the output rotational member 25 occurs in the state of FIG. 2 and is about to be transmitted toward the input shaft 22 side, the output cam 26 secured to the output rotational member 25 is rotated counterclockwise from an inoperative state shown in FIG. 2, whereby the edge portion 27d on the circumferentially inner end surface 27a is brought into contact with the cam surface 29a of the curved portion 29 of the coil spring 28 to be pressured thereon, as shown in FIG. 4. The pressuring force is divided in dependence on the oblique angle of the cam surface 29a at the contact point into a force which urges the coil spring 28 to rotate counterclockwise along the internal surface 21a and another force F1 which pushes the cam surface 29a in the direction normal thereto.

The former force serves to expand the outer diameter of the coil spring 28, as mentioned in explaining the prior art device, and the friction force of the coil spring 28 against the internal surface 21a of the cylinder member 21 is increased, whereby the coil spring 28 is prevented from sliding along the internal surface 21a. Further, the latter force F1 generates a force F2 which pressures the neighborhood of the curved portion 29 of the coil spring 28 against the internal surface 21a of the cylinder member 21, and the friction force depending on the force F2 is added to the friction force depending on the former force. In this way, the force with which the edge portion 27d of the cutout 27 pushes the cam surface 29a of the coil spring 28 works to pressure the neighborhood of the curved portion 29 of the coil spring 28 against the internal surface 21a of the cylinder member 21, in addition to expanding the outer diameter of the coil spring 28 in the same manner as the aforementioned prior art device to increase the pressuring force of the coil spring 28 against the internal surface 21a of the cylinder member 21. As a consequence, since the force which prevents the coil spring 28 from sliding along the internal surface 21a of the cylinder member 21 is additionally reinforced, the rotation transmission from the output rotational member 25 side toward the input shaft 22 side can be prevented reliably irrespective of the operation condition given to the one-way clutch 20.

In this case, while an increase in the rotational force exerted from the output cam 26 brings about an increase in a surface pressure which is generated between the edge portion 27d and the cam surface 29a, the rotational force exceeding a predetermined limit is received and stopped upon contact of the outside surface of the curved portion 29 with the outside end surface 27b of the circumferentially inner end surface 27a, so that the surface pressure can be prevented from being increased to an excessively large pressure. Also when the clockwise rotation of the output rotational member 25 takes place and is about to be transmitted toward the input shaft 22 side, the rotation transmission from the output rotational member 25 side toward the input shaft 22 side can be prevented reliably in the same manner as described above irrespective of the operation condition given to the one-way clutch 20.

Figure 2:
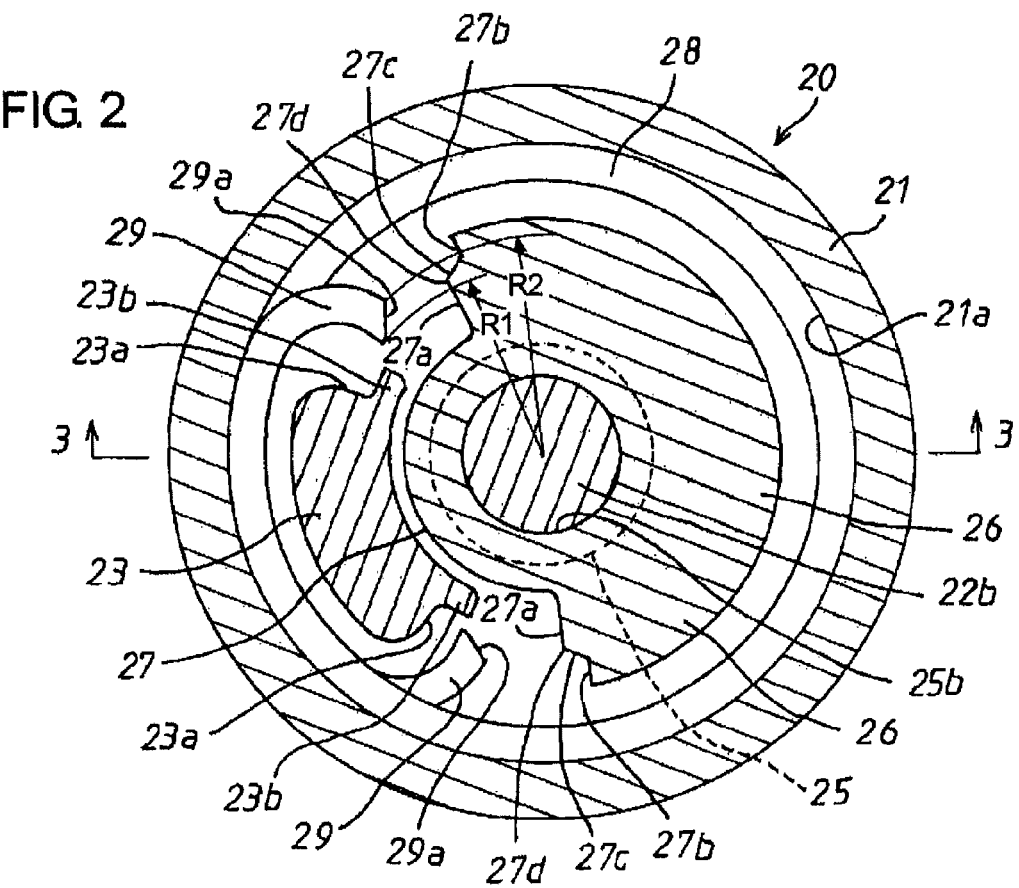
FIG. 2 is an enlarged cross-sectional view taken along the line 2-2 of the one-way clutch shown in FIG. 1.

Further, when the clockwise rotation of the input shaft 22 takes place in the state of FIG. 2 and is about to be transmitted toward the output rotational member 25 side, the input cam 23 secured to the input shaft 22 is rotated clockwise from the inoperative state shown in FIG. 2, and first of all, the circumferentially outer end surface 23a is brought into contact with the inside surface of the curved portion 29 of the coil spring 28 to pressure the inside surface as indicated by the arrow F4 in FIG. 5. Since the pressuring force F4 generates a force F5 to contract the outer diameter of the coil spring 28, the coil spring 28 is rotated with the rotation of the input cam 23. Then, the protruding portion 23b of the input cam 23 is brought into contact with the circumferentially inner end surface 27a of the cutout 27 to push the circumferentially inner end surface 27a with a force F3. As a consequence, the input cam 23 causes the coil spring 28, the output cam 26 and the output rotational member 25 to rotate.

In the inoperative state, the cam surface 29a of the curved portion 29 of the coil spring 28 may remain in contact with the edge portion 27d of the cutout 27 of the output cam 26, as shown in FIG. 4. In this case, first of all, the protruding portion 23b of the input cam 23 is brought into the circumferentially inner end surface 27a of the cutout 27 to push the circumferentially inner end surface 27a with the force F3. Thus, the output cam 26 and the output rotational member 25 are rotated with the result that the edge portion 27d is separated from the cam surface 29a. Thereafter, the circumferentially outer end surface 23a is brought into contact with the inside surface of the curved portion 29 of the coil spring 28 and pushes the inside surface with the force F4 to rotate the coil spring 28. That is, also in this case, the input cam 23 causes the output cam 26, the output rotational member 25 and the coil spring 28 to rotate. Also when the counterclockwise rotation of the input shaft 22 takes place and is about to be transmitted toward the output rotational member 25 side, rotation transmission is performed from the input shaft 22 side to the output rotational member 25 side in the same manner as described above.

In the foregoing first embodiment, the curved portions 29 are formed respectively at the both ends of the coil spring 28, and the extreme end of each curved portion 29 is placed within the clearance between each circumferentially outer end surface 23a of the input cam 23 and each circumferentially inner end surface 27a of the cutout 27 of the output cam 26. With this construction, even when the direction in which the input shaft 22 and the output rotational member 25 are rotated is any of the positive and negative-going directions, the rotation transmission from the output rotational member 25 side toward the input shaft 22 side can be prevented reliably irrespective of the operation condition given to the one-way clutch 20, and the rotation transmission is not performed from the output rotational member 25 side toward the input shaft 22 side. However, the present invention is not limited to the construction described above. In a modified form, the curved portion 29 may be formed at one end only of the coil spring 28, and the extreme end of the sole curved portion 29 may be placed within one of the clearances which are formed between the circumferentially outer end surfaces 23a of the input cam 23 and the circumferentially inner end surfaces 27a of the cutout 27 of the output cam 26. With this modified construction taken, in a shaft drive train for rotation in one direction only, it can also be realized to transmit rotation from the input shaft 22 side toward the output rotational member 25 side, but to prevent the rotation transmission from the output rotational member 25 side toward the input shaft 22 side.

The foregoing first embodiment wherein the coil spring 28 is inserted into the internal surface 21a of the cylinder member 21 secured to the housing 10 and wherein the input cam 23 and the output cam 26 are provided radially inside the coil spring 28 and the cylinder member 21 is suitable for use in transmitting rotation between two shafts.

Further, the one-way clutch 20 in the foregoing first embodiment is applied to the electric parking brake device A. Thus, the electric parking brake device A is capable of reliably preventing the parking brakes from being loosened while the parking brakes are held in the braking state, so that the reliability of the electric parking brake device A can be enhanced.

Figure 6:
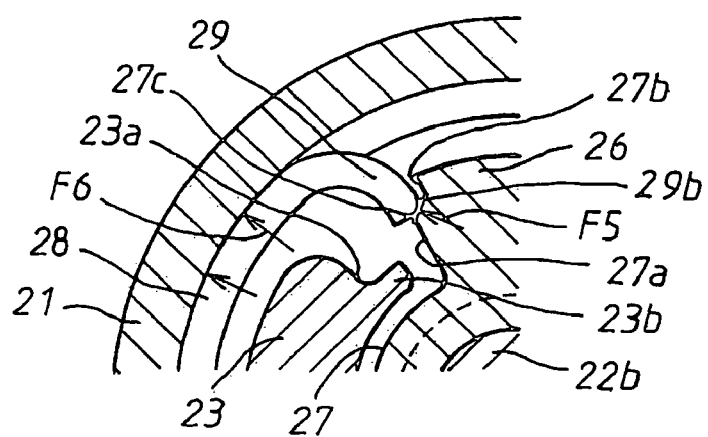
FIG. 6 is a fragmentary cross-sectional view showing a first modified form of the first embodiment.

FIG. 6 shows a first modified form regarding the construction which is taken at the contact section between the extreme end of each curved portion 29 of the coil spring 28 and each circumferentially inner end surface 27a of the cutout 27 of the output cam 26 in the foregoing first embodiment. In the first modified form, a rounded chamfer portion 29b is formed at the juncture between the outside surface and the extreme end of each curved portion 29 of the coil spring 28. Further, although the oblique surface 27c and the outside end surface 27b which are formed at the outside end portion of each circumferentially inner end surface 27a of the cutout 27 of the output cam 26 are substantially the same as those in the foregoing first embodiment, the oblique surface 27c is formed to be a cam surface for contact with the rounded chamfer portion 29b.

In the first modified form, when rotation is about to be transmitted from the output rotational member 25 side toward the input shaft 22 side, the cam surface 27c of the cutout 27 of the output cam 26 is brought into contact with the rounded chamfer portion 29b at the extreme end of the curved portion 29 of the coil spring 28 to pressure the rounded chamfer portion 29b. In the same manner as mentioned earlier, the pressuring force is divided in dependence on the oblique angle of the cam surface 27c into the force which urges the coil spring 28 to rotate and the force F5 which pushes the rounded chamfer portion 29b in the direction normal to the cam surface 27c at the contact point. The former force serves to expand the outer diameter of the coil spring 28 to prevent the coil spring 28 from sliding along the internal surface 21a of the cylinder member 21. Further, the latter force F5 generates a force F6 which pressures the neighborhood of the curved portion 29 of the coil spring 28 against the internal surface 21a of the cylinder member 21, and the friction force depending on the force F6 is added to the friction force depending on the former force. As a consequence, since the force which prevents the coil spring 28 from sliding along the internal surface 21a of the cylinder member 21 is additionally reinforced, the rotation transmission from the output rotational member 25 side to the input shaft 22 side can be prevented reliably irrespective of the operation condition given to the one-way clutch 20 in the same manner as the foregoing first embodiment. Other constructions and operations in the first modified form are the same as those in the foregoing first embodiment, and therefore, the detailed description for such other constructions and operations is omitted for the sake of brevity.

Figure 7:
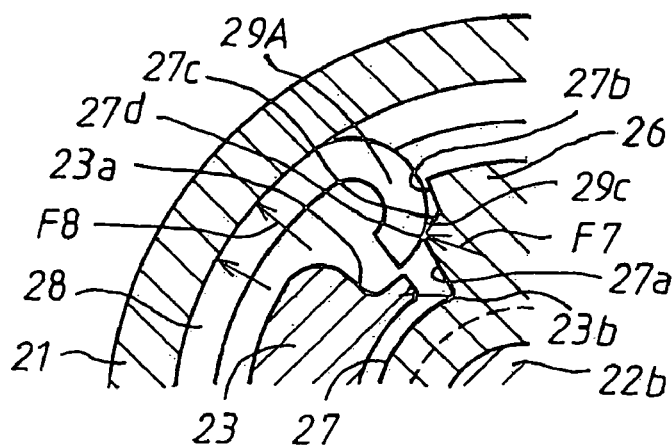
FIG. 7 is a fragmentary cross-sectional view showing a second modified form of the first embodiment.

FIG. 7 shows a second modified form regarding the construction which is taken at the contact section between the extreme end of each curved portion 29 of the coil spring 28 and each circumferentially inner end surface 27a of the cutout 27 of the output cam 26 in the foregoing first embodiment. In the second modified form, each curved portion (denoted as 29A in this modified form) of the coil spring 28 is curved along an approximately half circle, and a part 29c on the outside surface close to the extreme end takes the form of a cam surface. The oblique surface 27c and the outside end surface 27b which are formed at the outside end portion of each circumferentially inner end surface 27a of the cutout 27 of the output cam 26 are substantially the same as those in the foregoing first embodiment, wherein the edge portion 27d at the juncture between the circumferentially inner end surface 27a and the oblique surface 27c is contactable to the cam surface 29c of the curved portion 29A.

In the second modified form, when rotation is about to be transmitted from the output rotational member 25 side toward the input shaft 22 side, the edge portion 27d of the cutout 27 of the output cam 26 is brought into contact with the cam surface 29c on the curved portion 29A of the coil spring 28 to pressure the curved portion 29A. The pressuring force is divided in dependence on the oblique angle of the cam surface 29c at the contact point into the force which urges the coil spring 28 to rotate and a force F7 which pushes the cam surface 29c in the normal direction at the contact point. The former force serves to expand the outer diameter of the coil spring 28 to prevent the coil spring 28 from sliding along the internal surface 21a of the cylinder member 21. Further, the latter force F7 generates a force F8 which pressures the neighborhood of the curved portion 29A of the coil spring 28 against the internal surface 21a of the cylinder member 21, and the friction force depending on the force F8 is added to the friction force depending on the former force. As a consequence, since the force which prevents the coil spring 28 from sliding along the internal surface 21a of the cylinder member 21 is additionally reinforced, the rotation transmission from the output rotational member 25 side toward the input shaft 22 side can be prevented reliably irrespective of the operation condition given to the one-way clutch 20 in the same manner as the foregoing first embodiment. Other constructions and operations in the second modified form are the same as those in the foregoing first embodiment, and therefore, the detailed description for such other constructions and operations is omitted for the sake of brevity.

Second Embodiment

Next, a one-way clutch in the second embodiment according to the present invention will be described with reference to FIGS. 8 and 9. The one-way clutch 30 in the second embodiment is composed mainly of a round pillar or shaft (stationary member) 31, an input cam 33 formed bodily with an input gear (input rotational member) 32, an output cam 36 bodily formed with an output gear (output rotational member) 35, and a coil spring 38. The second embodiment differs from the foregoing first embodiment in that the stationary member for holding the coil spring 38 is not the cylinder member 21 but the round shaft 31 and that the input cam 33 and the output cam 36 are provided around the coil spring 38 and the round shaft 31.

The round shaft 31 fixed to a frame (not shown) of the one-way clutch 30 rotatably supports the input gear 32 and the output gear 35 with a predetermined distance secured therebetween in the axial direction. The output cam 36 of cylindrical shape having a sector-shape cutout 37 formed thereon is formed bodily on the output gear 35 and is protruded toward the input gear 32. The input cam 33 of sector shape is formed on the input gear 32 and is protruded toward the output gear 35 to be inserted into the cutout 37 of the output cam 36 with a clearance in the circumferentially direction between each circumferentially outer end surface 33a thereof and each circumferentially inner end surface 37a of the cutout 37. An annular space is provided between the outer or external surface 31a of the round shaft 31 and the respective internal surfaces of the input cam 33 and the output cam 36 for setting therein a coil spring 38 as described hereafter.

Between the input gear 32 and the output gear 35 in the axial direction, the coil spring 38 being plural in the number of turns is coiled around the external surface 31a of the round shaft 31 in such a manner that it is elastically pressured on the external surface 31a to be engaged frictionally. Both end portions of the coil spring 38 are curved about 90 degrees radially outward along an arc of a relatively large radius to constitute curved portions 39. The curved portions 39 at both end portions of the coil spring 38 are placed in respective clearances which are defined between the circumferentially outer end surfaces 33a of the input cam 33 and the circumferentially inner end surfaces 37a of the cutout 37. An oblique surface 37b spreading inward is formed at a radially inside half portion of each circumferentially inner end surface 37a of the cutout 37. A corner or edge portion 37c which is axially partly formed at the juncture between each oblique surface 37b and the internal surface of the output cam 36 is contactable with a cam surface 39a which is partly formed on the curved inside surface of each curved portion 39 of the coil spring 38.

Over an axial area which does not interfere with one of the curved portions 39 at both axial ends of the coil spring 38, a protruding portion 33b is formed on one circumferentially outer end surface 33a of the input cam 33 and is protruded therefrom toward the circumferentially inner end surface 37a of the cutout 37. Further, over another axial area which does not interfere with the other curved portion 39 at the other axial end of the coil spring 38, another protruding portion 33c is formed on the other circumferentially outer end surface 33a of the input cam 33 and is protruded therefrom toward the circumferentially inner end surface 37a of the cutout 37.

Operation of Second Embodiment

Hereafter, description will be made regarding the operation of the one-way clutch 30 as constructed above in the second embodiment. When the counterclockwise rotation of the output gear 35 takes place from the position indicated by the solid line in FIG. 8 and is about to be transmitted toward the input gear 32 side, the output cam 36 bodily formed on the output gear 35 is rotated clockwise, whereby the edge portion 37c of the circumferentially inner end surface 37a is brought into contact with the cam surface 39a of the curved portion 39 of the coil spring 38 to be pressured on the cam surface 39a, as indicated by the two-dot-chain line 37aA. Likewise in the foregoing first embodiment, the pressuring force is divided in dependence on the oblique angle of the cam surface 39a at the contact point into a force which urges the coil spring 38 to rotate counterclockwise along the external surface 31a of the round shaft 31 and a force which pushes the cam surface 39a in the direction normal thereto. The former force acts to contract the internal surface of the coil spring 38 and hence, becomes a friction force that prevents the coil spring 38 from sliding on the external surface 31a, whereas the latter force acts to pressure the neighborhood of the curved portion 39 of the coil spring 38 on the external surface 31a of the round shaft 31. Thus, the friction force depending on the latter force is added to the friction force depending on the former force. As a result, the force that prevents the coil spring 38 from sliding on the external surface 31a of the round shaft 31 is additionally reinforced, whereby the rotation transmission from the output gear side 35 side toward the input gear 32 side can be prevented reliably irrespective of the operation condition given to the one-way clutch 30. Also when the clockwise rotation of the output gear 35 takes place and is about to be transmitted toward the input gear 32 side, the rotation transmission from the output gear 35 side toward the input gear 32 side can be prevented reliably in the same manner as described above.

Figure 8:
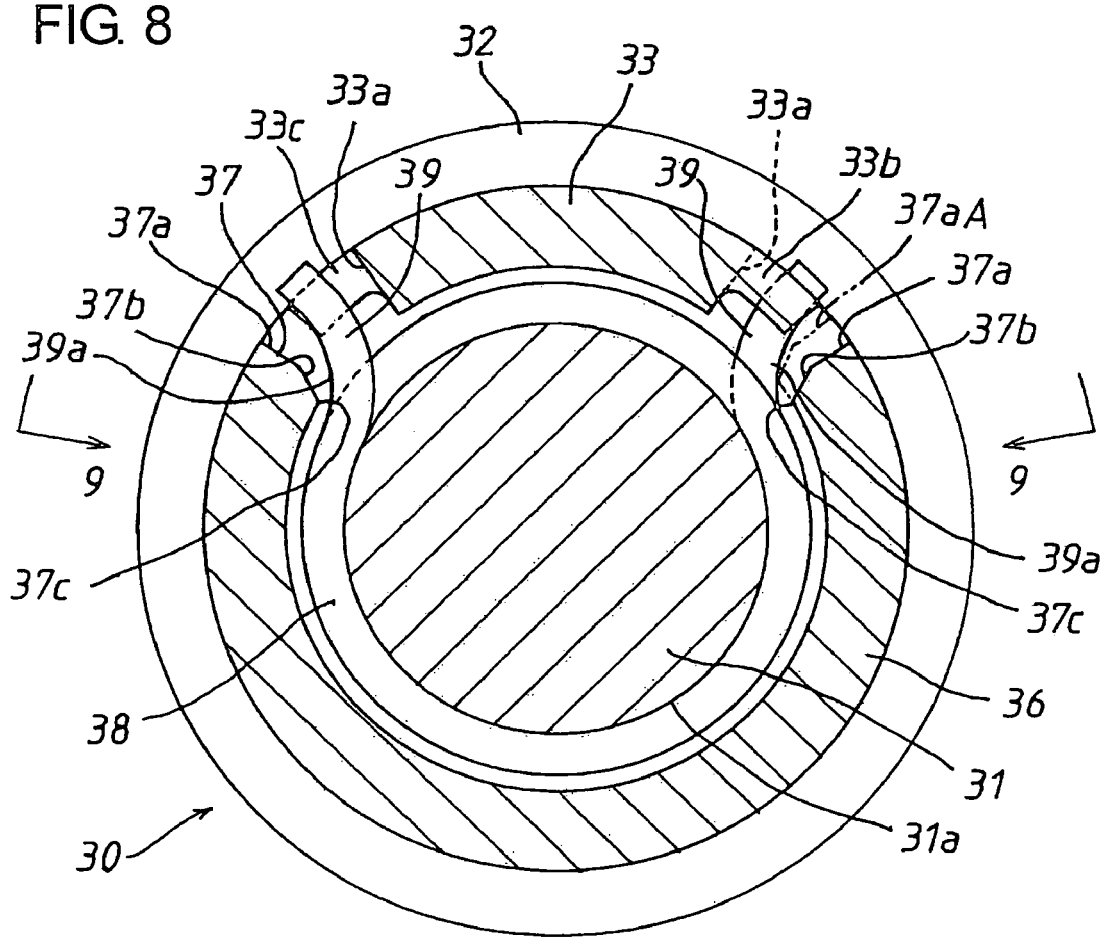
FIG. 8 is a cross-sectional view corresponding to FIG. 2 of a one-way clutch in a second embodiment according to the present invention.
Figure 9:
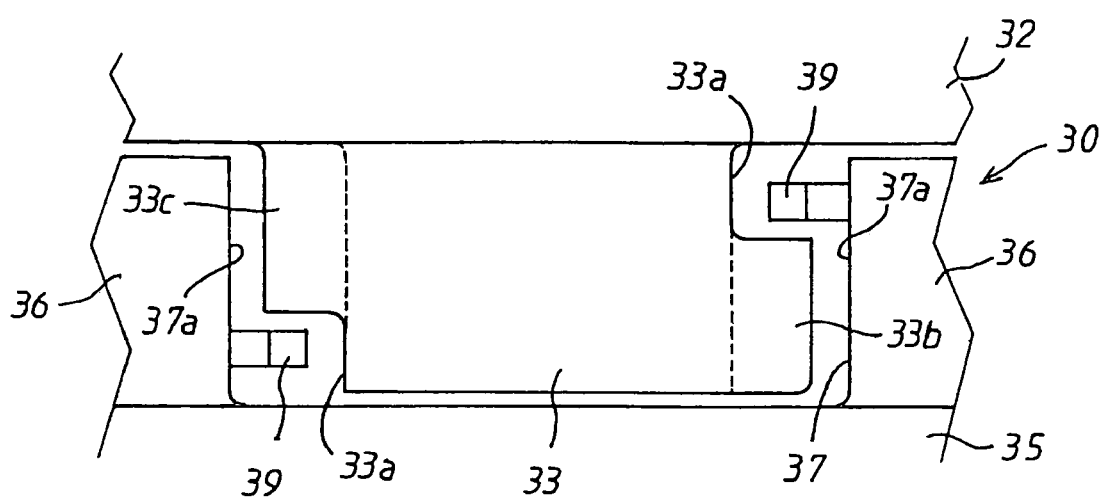
FIG. 9 is a fragmentary sectional view taken along the line 9-9 in FIG. 8.

Also when the clockwise rotation of the input gear 32 takes place in the state shown in FIG. 8 to be transmitted toward the output gear 35 side, the input cam 33 formed bodily with the input gear 32 is rotated clockwise as viewed in FIG. 8, and the extreme end of the protruding portion 33b is brought into contact with the circumferentially inner end surface 37a of the cutout 37, and the edge portion 37c of the cutout 37 is released from the contact with the cam surface 39a of the curved portion 39. Thus, the output cam 36 and the output gear 35 are rotated clockwise together with the input cam 33. Further, since the circumferentially outer end surface 33a is brought into contact with the curved portion 39 of the coil spring 38 to expand the inner diameter of the coil spring 38, the same is also rotated clockwise together with the input cam 33. On the contrary, when the counterclockwise rotation of the input gear 32 takes place and is about to be transmitted toward the output gear 35 side, the rotation is transmitted from the input gear 32 side toward the output gear 35 side in the same manner as described above.

The length of each protruding portion 33b, 33c is determined to be such a dimension that a clearance exists between the cam surface 39a of each curved portion 39 and the edge portion 37c associated therewith of the cutout 37 in the state that in FIG. 8, the protruding portion 33b or 33c is held in contact with the circumferentially inner end surface 37a associated therewith of the cutout 37 and that the curved portion 39 on the same side of the coil spring 38 is held in contact with the circumferentially outer end surface 33a on the same side of the input cam 33. Other constructions and operations in the second embodiment are the same as those in the foregoing first embodiment, and therefore, the detailed description for such other constructions and operations is omitted for the sake of brevity.

Finally, various features and many of the attendant advantages in the foregoing embodiments will be summarized as follows:

In each of the foregoing first embodiment, the modified forms thereof and the second embodiment typically shown in FIGS. 2 and 6 to 8, when the rotation of the output rotational member 25, 35 is about to be transmitted to the input rotational member 22, 32, the part 27d, 27c, 37c of the cutout 27, 37 of the output cam 26, 36 pushes the part 29a, 29b, 29c, 39a of the curved portion 29, 29A, 39 of the coil spring 28, 38, and the pressuring force pressures the neighborhood of the curved portion 29, 29A, 39 on the circumferential surface 21a, 31a of the stationary member 21, 31 in addition to changing the diameter of the coil spring 28, 38 to increase the pressuring force of the coil spring 28, 38 against the circumferential surface 21a, 31a of the stationary member 21, 31. Thus, the force which prevents the coil spring 28, 38 from sliding on the circumferential surface 21a, 31a of the stationary member 21, 31 is additionally reinforced, so that the rotation transmission from the output rotational member 25, 35 toward the input rotational member 22, 32 can be prevented reliably irrespective of the operation condition given to the one-way clutch 20, 30.

Also in each of the foregoing first embodiment, the modified forms thereof and the second embodiment typically shown in FIGS. 2 and 6 to 8, even when the input rotational member 22, 32 and the output rotational member 25, 35 are about to be rotated in any of the positive and negative-going directions, the rotation transmission from the output rotational member 25, 35 toward the input rotational member 22, 32 can be prevented reliably irrespective of the operation condition given to the one-way clutch 20, 30, while the rotation transmission can be performed from the input rotational member 22, 32 to the output rotational member 25, 35.

In the foregoing first embodiment and the modified forms thereof typically shown in FIGS. 2, 6 and 7, the one-way clutch 20 is suitable for use in the case that the input rotational member 22 and the output rotational member 25 are shaft members, in which case the same advantages as those described above can also be attained.

In the foregoing second embodiment typically shown in FIG. 8, the one-way clutch 30 is suitable for use in the case that the input rotational member 32 and the output rotational member 35 are rotary members such as gear, pulley or the like which perform the input/output of rotational power at outer circumferential parts thereof, in which case the same advantages as those described above can also be attained.

Also in the foregoing embodiments typically shown in FIG. 1, the foregoing one-way clutch 20, 30 in any of the first embodiment, the modified forms thereof and the second embodiment is utilized and incorporated into the electric parking brake device A. Therefore, the electric parking brake device A can reliably prevent the brake being loosened while the parking brakes are held in the braking state, and hence, can be enhanced in reliability as electric parking brake device.

Obviously, numerous further modifications and variations of the present invention are possible in light of the above teachings. It is therefore to be understood that within the scope of the appended claims, the present invention may be practiced otherwise than as specifically described herein.

What is claimed is:

1. A one-way clutch for transmitting rotation from an input rotational member side toward an output rotational member side but for preventing rotation from being transmitted from the output rotational member side toward the input rotational member side, the one-way clutch comprising:

a stationary member having a cylindrical surface;

the input rotational member and the output rotational member each provided rotatably relative to the stationary member;

an output cam provided bodily with the output rotational member and having a cutout of sector shape coaxial with the axis of the output rotational member;

an input cam provided bodily with the input rotational member and inserted into the cutout with clearances secured in the circumferential direction between circumferentially outer end surfaces thereof and circumferentially inner end surfaces of the cutout;

a coil spring placed in an annular space between the circumferential surface of the stationary member and respective circumferential surfaces of the input and output cams and frictionally engageable with the circumferential surface of the stationary member when pressured resiliently on the circumferential surface of the stationary member, the coil spring having at least at one end thereof a curved portion which is placed in one of the clearances;

a cam surface formed on one of a part of the cutout and a part of the curved portion which are brought into contact with each other when the rotation of the output rotational member is about to be transmitted toward the input rotational member, the cam surface being inclined to generate a force which expands the outer diameter of the coil spring to increase the friction force of the coil spring with the cylindrical surface of the stationary member and to generate a force which pressures the neighborhood of the curved portion of the coil spring on the circumferential surface of the stationary member, upon contact with the other of the parts of the cutout and the curved portion; and a protruding portion formed on, and protruded from, one of a circumferentially outer end surface of the input cam and a circumferentially inner end surface, facing the circumferentially outer end surface, of the cutout toward the other of the circumferentially outer and inner end surfaces, the protruding portion being contactable with the other of the circumferentially outer and inner end surfaces when the rotation of the input rotational member is about to be transmitted toward the output rotational member, for separating the cam surface from the other of the parts of the cutout and the curved portion and for performing the rotation transmission.

2. The one-way clutch as set forth in claim 1, wherein: the stationary member is a cylinder member having the circumferential surface of cylindrical shape at an internal surface thereof; the coil spring is frictionally engageable with the circumferential surface formed on the internal surface of the cylinder member when pressured resiliently thereon; and the curved portion is curved radially inward.

3. The one-way clutch as set forth in claim 1, wherein: the stationary member is a round shaft having the circumferential surface of cylindrical shape at an external surface thereof; the coil spring is frictionally engageable with the circumferential surface formed on the external surface of the round shaft when pressured resiliently thereon; and the curved portion is curved radially outward.

4. An electric parking brake device incorporating the one-way clutch as set forth in claim 1 for selectively bringing a parking brake for at least one wheel of a vehicle into a braking state and a braking release state, the electric parking brake device comprising:
an electric motor having an output shaft rotatable selectively in either of first and second directions; and
a rotation transmission mechanism drivingly connected to the parking brake and drivingly rotatable by the electric motor in either of the first and second directions for bringing the parking brake into the braking state when rotated in the first direction but into the braking release state when rotated in the second direction;
wherein the one-way clutch as set forth in claim 1 is provided at a part of a rotation transmission train of the rotation transmission mechanism with the input rotational member thereof rotatable by the output shaft of the electric motor and with the output rotational member drivingly connected to the parking brake, for allowing the rotation of the input rotational member thereof to be transmitted to the output rotational member thereof, but for preventing the rotation of the output rotational member thereof in one of the first and second directions from being transmitted toward the input rotational member.

5. A one-way clutch for transmitting rotation from an input rotational member side toward an output rotational member side in either rotational direction but for preventing rotation from being transmitted from the output rotational member side toward the input rotational member side, the one-way clutch comprising:
a stationary member having a cylindrical surface;
the input rotational member and the output rotational member each provided rotatably relative to the stationary member;
an output cam provided bodily with the output rotational member and having a cutout of sector shape coaxial with the axis of the output rotational member;
an input cam provided bodily with the input rotational member and inserted into the cutout with clearances secured in the circumferential direction between circumferentially outer end surfaces thereof and circumferentially inner end surfaces of the cutout;
a coil spring placed in an annular space between the circumferential surface of the stationary member and respective circumferential surfaces of the input and output cams and frictionally engageable with the circumferential surface of the stationary member when pressured resiliently on the circumferential surface of the stationary member, the coil spring having at both ends thereof curved portions which are placed respectively in the clearances;
cam surfaces each formed on one of a part of each circumferentially inner end surface of the cutout and a part of each curved portion which are brought into contact with each other when the rotation of the output rotational member is about to be transmitted toward the input rotational member, each of the cam surfaces being inclined to generate a force which expands the outer diameter of the coil spring to increase the friction force of the coil spring with the cylindrical surface of the stationary member and to generate a force which pressures the neighborhood of the curved portion on the same side of the coil spring on the circumferential surface of the stationary member, upon contact with the other of the parts of the cutout and the curved portion on the same side; and
protruding portions each formed on, and protruded from, one of each circumferentially outer end surface of the input cam and each circumferentially inner end surface, facing therewith, of the cutout toward the other of each circumferentially outer and inner end surfaces, each of the protruding portions being contactable with the other of each circumferentially outer and inner end surfaces when the rotation of the input rotational member in either rotational direction is about to be transmitted toward the output rotational member, for separating each cam surface from the other of the parts of the cutout and the curved portion on the same side and for performing the rotation transmission in either rotational direction.

6. The one-way clutch as set forth in claim 5, wherein: the stationary member is a cylinder member having the circumferential surface of cylindrical shape at an internal surface thereof; the coil spring is frictionally engageable with the circumferential surface formed on the internal surface of the cylinder member when pressured resiliently thereon; and each of the curved portions is curved radially inward.

7. The one-way clutch as set forth in claim 5, wherein: the stationary member is a round shaft having the circumferential surface of cylindrical shape at an external surface thereof; the coil spring is frictionally engageable with the circumferential surface formed on the external surface of the round shaft when pressured resiliently thereon; and each of the curved portions is curved radially outward.

8. An electric parking brake device incorporating the one-way clutch as set forth in claim 5, for selectively bringing a parking brake for at least one wheel of a vehicle into a braking state and a braking release state, the electric parking brake device comprising:
an electric motor having an output shaft rotatable selectively in either of first and second directions; and
a rotation transmission mechanism drivingly connected to the parking brake and drivingly rotatable by the electric motor in either of the first and second directions for bringing the parking brake into the braking state when rotated in the first direction but into the braking release state when rotated in the second direction;

wherein the one-way clutch as set forth in claim 5 is provided at a part of a rotation transmission train of the rotation transmission mechanism with the input rotational member thereof rotatable by the output shaft of the electric motor and with the output rotational member drivingly connected to the parking brake, for allowing the rotation of the input rotational member thereof to be transmitted to the output rotational member thereof, but for preventing the rotation of the output rotational member thereof in either of the first and second directions from being transmitted toward the input rotational member.

* * * * *